United States Patent
Ogawa et al.

[11] Patent Number: 6,054,190
[45] Date of Patent: Apr. 25, 2000

[54] METHOD FOR PRODUCING AN ALIGNMENT CHEMISORPTION MONOMOLECULAR FILM

[75] Inventors: Kazufumi Ogawa, Nara; Takaiki Nomura; Tadashi Ootake, both of Osaka, all of Japan

[73] Assignee: Matsushita Electric Industrial Co., Ltd., Osaka, Japan

[21] Appl. No.: 09/264,590

[22] Filed: Mar. 8, 1999

[30] Foreign Application Priority Data

Mar. 11, 1998 [JP] Japan .................................. 10-060202
Mar. 11, 1998 [JP] Japan .................................. 10-060203

[51] Int. Cl.$^7$ ...................................................... C08J 7/04
[52] U.S. Cl. .......................... 427/510; 427/58; 427/261; 427/335; 427/385.5; 427/407.1; 427/553; 427/595
[58] Field of Search ..................... 427/510, 553, 427/595, 58, 261, 335, 385.5, 407.1

[56] References Cited

U.S. PATENT DOCUMENTS 5,133,895  7/1992  Ogawa et al. .
5,186,986  2/1993  Ogawa .
5,256,456  10/1993  Ogawa .
5,515,190  5/1996  Ogawa et al. .

*Primary Examiner*—Bernard Pianalto
*Attorney, Agent, or Firm*—Merchant & Gould P.C.

[57] ABSTRACT

A method for producing an alignment chemisorption monomolecular film having high efficiency of washing solution and being excellent in alignment property of molecules constituting the alignment monomolecular film. The method comprises the step of forming a monomolecular film by chemisorption on a hydrophilic surface of a base material by bringing the hydrophilic surface into contact with a silane-based surfactant having a carbon chain or a siloxane bond chain so as to cause a chemical reaction between them, thereby bonding one end of the surfactant molecules to the hydrophilic surface, orienting the base material in a predetermined orientation, and then vapor washing the base material in vapor of an organic solvent, and aligning molecules constituting the monomolecular film by the flow of condensation of the organic solvent formed on the surface of the base material during the vapor washing.

29 Claims, 9 Drawing Sheets

METHOD FOR PRODUCING AN ALIGNMENT CHEMISORPTION MONOMOLECULAR FILM

FIELD OF THE INVENTION

The present invention relates to a method for producing an alignment chemisorption monomolecular film in which molecules constituting the film are aligned and chemically adsorbed to a base material, etc. In more detail it relates to a method for producing an alignment chemisorption monomolecular film usable as thin film materials used at molecular level, such as a fluorine antifouling monomolecular film, a liquid crystal alignment film, a polarization film, a phase retardation film, a conductive film for a molecule device, or the like.

BACKGROUND OF THE INVENTION

Hitherto, a chemisorption monomolecular film is generally produced by a method comprising the steps of immersing a base material in a chemisorption solution prepared by dissolving chemisorption materials in a solvent, thereby reacting the surface of the base material and the chemisorption materials in the chemisorption solution for a predetermined time, and then washing and removing unnecessary chemisorption materials by using an inorganic solvent.

For example, a chemisorption solution was prepared by dissolving a silane-based surfactant comprising a linear hydrocarbon group and Si ("chemisorption material" or "chemisorption compound" also will be used hereinafter) in a nonaqueous solvent at a concentration of about 1 weight %. Thereafter, a base material is immersed in the chemisorption solution to cause a chemisorption reaction in the chemisorption solution for a predetermined time, then the base material is taken out from the chemisorption solution, and excess chemisorption materials attached to the surface of the base material are removed by rinsing with a nonaqueous organic solvent. Thus, a chemisorption monomolecular film can be obtained. Furthermore, in order to align molecules constituting the chemisorption monomolecular film, the washing solution was drained off while orienting the base material in a predetermined orientation in accordance with the alignment orientation.

However, in the conventional method for producing a chemisorption monomolecular film, a base material is immersed in a nonaqueous organic solvent for washing to wash the surface of the base material. Consequently, the washing solution is much deteriorated so much and the efficiency is bad. Furthermore, since the drain-off of the washing solution is carried out only once when the base material is taken out from the washing solution after washing, the alignment treatment also is carried out only once by this drain-off treatment. Therefore, the alignment of molecules constituting the monomolecular film is not so good.

Furthermore, in the case where a chemisorption monomolecular film having an alignment property is produced as a liquid crystal alignment film, as the conventional method, a so-called rubbing method is employed. The conventional rubbing method comprises the steps of forming a film by rotary-coating a solution comprising an organic solvent such as polyvinyl alcohol or polyimide, and then rubbing the film with a felt cloth, etc. However, there is a problem that the obtained liquid crystal aligned film is poor in uniformity in surface step portions or for a large area panel (such as a 14 inch display). Moreover, due to rubbing treatment, defects are generated in thin film transistors (TFTs), and debris generated by rubbing causes defects in display. Furthermore, such a rubbing method is not convenient for producing the so-called multi-domain liquid crystal display apparatus having a plurality of sections having different alignment directions of liquid crystal in pixels.

SUMMARY OF THE INVENTION

It is therefore an object of the present invention to provide a method capable of producing an alignment chemisorption monomolecular film that provides high efficiency utilization of the washing solution and excellent alignment property of molecules constituting the film.

In order to accomplish the above-mentioned objects, the method for producing an alignment chemisorption monomolecular film of the present invention comprises a process (A) and a process (B). The process (A) comprises the step of forming a monomolecular film by chemisorption on a hydrophilic surface of a base material by bringing the hydrophilic surface into contact with a silane-based surfactant having a carbon chain or a siloxane bond chain so as to cause a chemical reaction between them, thereby bonding one end of the surfactant molecules to the hydrophilic surface. The process (B) comprises the steps of orienting the base material with the monomolecular film in a predetermined orientation, vapor washing the base material with vapor of an organic solvent, and performing a first alignment of the surfactant molecules constituting the film by the flow of condensation of the vapor that was formed on the film.

Thus, according to the method of the present invention, since the base material is washed in vapor, the base material and the washing solution are not in direct contact with each other, preventing the deterioration of the washing solution. Furthermore, in a method of the present invention, since molecules constituting the monomolecular film are aligned repeatedly by the flow of the washing solution condensed on the surface of the substrate in the vapor washing, the monomolecular film with excellent in alignment property can be obtained. Moreover, the monomolecular film of the present invention also includes a film in which most parts are monomolecules but some parts of molecules are laminated, in addition to the so-called monomolecular film.

It is preferable in the method of the present invention that a process (C) is included in addition to the processes (A) and (B). The process (C) comprises the steps of irradiating the chemisorption monomolecular film with polarized light, thereby performing a second alignment of the first aligned surfactant molecules in the direction of the polarized light. With such a method, an alignment chemisorption monomolecular film further improved in alignment property can be produced.

It is preferable in the method of the present invention that the silane-based surfactant comprises a photosensitive group, at least one molecular chain selected from the group consisting of a linear carbon chain and a siloxane bond chain, and at least one functional group selected from the group consisting of a chlorosilyl group, an alkoxysilyl group, an isocyanate silyl group. By using such a surfactant, an alignment chemisorption monomolecular film can be produced efficiency. Furthermore, by the irradiation with polarized light, the photosensitive groups are polymerized or crosslinked with each other and the silane-based surfactant molecules are fixed with each other. Consequently, the alignment of the molecules constituting the alignment chemisorption monomolecular film can be made stable.

It is preferable in the method of the present invention that the photosensitive group is at least one functional group selected from the group consisting of a cinnamoyl group, a chalcone group, a methacryloyl group and a diacetylene group. These photosensitive groups have high photosensitivity and can polymerize the silane-based surfactant molecules at low energy.

It is preferable in the method of the present invention that the silane-based surfactant comprises at least one functional group selected from the group consisting of a trifluoromethyl group, a methyl group, a vinyl group, an allyl group, an ethynyl group, a phenyl group, an aryl group, a halogen group, an alkoxy group, a cyano group, an amino group, a hydroxyl group, a carbonyl group, an ester group and a carboxyl group. When such silane-based surfactants are used, an alignment chemisorption monomolecular film having a different surface energy can be produced effectively.

It is preferable in the method of the present invention that the silane-based surfactant comprises at least one molecular chain of a linear carbon chain and a siloxane bond chain, and at least one functional group selected from the group consisting of a chlorosilyl group, an alkoxysilyl group and an isocyanate silyl group, and the organic solvent for vapor washing comprises a nonaqueous organic solvent containing no water. With such a method, the effect of washing is improved and an alignment chemisorption monomolecular film can be produced effectively.

It is preferable in the method of the present invention that the nonaqueous organic solvent comprises at least one group selected from the group consisting of an alkyl group, a carbon fluoride group, a carbon chloride group and a siloxane group. By using such a non-aqueous organic solvent, a clean alignment chemisorption monomolecular film can be produced.

It is preferable in the method of the present invention that a film comprising a large number of SiO groups is formed on the surface of the base material, and a monomolecular film is formed on this film. Thus, an alignment chemisorption monomolecular film having a high density can be produced effectively.

Next, a method for producing a liquid crystal alignment film of the present invention comprises the method for producing an alignment chemisorption monomolecular film of the present invention, wherein, in the process (A), the base material is a substrate provided with electrodes, and at least the surface provided with electrodes of the substrate is brought into contact with the silane-based surfactant.

As mentioned above, according to the method for producing a liquid crystal alignment film of the present invention, molecules constituting the monomolecular film are aligned without a rubbing treatment. Therefore, the liquid crystal alignment film obtained by the method of the present invention is excellent in uniformity. Furthermore, since rubbing treatment is not performed in this method, there arise no defects in TFT and display. Furthermore, the method of the present invention can be employed for producing a multi-domain type liquid crystal display apparatus.

It is preferable in the method for producing a liquid crystal alignment film of the present invention that the silane-based surfactant comprises a photosensitive group, and a process (D) is included in addition to the processes (A) and (B). The process (D) comprises the step of irradiating the first aligned surfactant molecules of the monomolecular film so as to fix a state of the first alignment by polymerizing or crosslinking the photosensitive groups with each other.

It is preferable that the process (D) comprises the step of irradiating the monomolecular film, in which the state of a first alignment is fixed, with polarized light, thereby performing a second alignment of the first alignment surfactant molecules, and fixing a state of a second alignment by polymerizing or crosslinking the photosensitive groups with each other at the same time. Thus, a liquid crystal alignment film that is further improved in alignment stability can be obtained.

It is possible to produce a multi-domain type liquid crystal alignment film by carrying out patterned irradiation of polarized light twice or more in the method for producing a liquid crystal alignment film of the present invention.

It is preferable in the method for producing a liquid crystal alignment film of the present invention that the silane-based surfactant comprises at least one group selected from the group consisting of a chlorosilyl group, an alkoxysilyl group and an isocyanate silyl group. Such a silane-based surfactant has high reactivity, so that the time of producing a liquid crystal alignment film can be reduced.

It is preferable that the photosensitive group is at least one photosensitive group selected from the group consisting of a cinnamoyl group, a chalcone group, a methacryloyl group and a diacetylene group.

In the method for producing a liquid crystal alignment film of the present invention, by mixing and using plural kinds of silane-based surfactants as the silane-based surfactant, a liquid crystal alignment film in which the pre-tilt angle of liquid crystal is controllable can be obtained.

For example, a plural kinds of silane-based surfactants having different molecular lengths are mixed and used as the silane-based surfactant, and the tilt of the silane-based surfactant molecules having the longest molecular length in the mixture with respect to the substrate is controlled to a constant angle by changing the molecular length of the silane-based surfactant molecules having a relatively shorter molecular length in the mixture. Thus, a liquid crystal alignment film capable of controlling the pre-tilt angle of liquid crystal can be manufactured.

Moreover, the silane-based surfactant molecules having a relatively shorter molecular length denotes molecules which are shorter when compared with the silane-based surfactant molecules contained in the mixture.

Furthermore, when mixing the silane-based surfactant, by changing the mixing ratio of a plural kinds of silane-based surfactants, and by controlling the tilt of the silane-based surfactant molecules having the longest molecular length in the mixture with respect to the substrate, a liquid crystal alignment film capable of controlling the pre-tilt angle of liquid crystal can be produced.

It is preferable in the method for producing a liquid crystal alignment film of the present invention that the silane-based surfactant comprises at least one molecular chain of a linear carbon chain and a siloxane bond chain, and at least one functional group selected from the group consisting of a chlorosilyl group, an alkoxysilyl group and an isocyanate silyl group, and the organic solvent for the vapor washing comprises a nonaqueous organic solvent containing no water. Thus, it is possible to prevent surface defects of the obtained liquid crystal alignment film.

It is preferable that the silane-based surfactant comprises a carbon chain or a siloxane bond chain, and at least one functional group selected from the group consisting of a trifluoromethyl group, a methyl group, a vinyl group, an allyl group, an ethynyl group, a phenyl group, an aryl group, a halogen group, an alkoxy group, a cyano group, an amino group, a hydroxyl group, a carbonyl group, an ester group and a carboxyl group at the terminal or part of the carbon chain or siloxane bond chain. By using such silane-based surfactants, the surface energy of the obtained liquid crystal alignment film can be controlled, that is, a liquid crystal alignment film capable of controlling the pre-tilt angle of liquid crystal can be produced.

It is preferable in the method of the present invention that the nonaqueous organic solvent comprises at least one group selected from the group consisting of an alkyl group, a carbon fluoride group, a carbon chloride group and a siloxane group. By using such a nonaqueous organic solvent, surface defects of the obtained liquid crystal alignment film further can be prevented.

It is preferable in the method for producing a liquid crystal alignment film of the present invention that a substrate on which a film having SiO groups at least on the surface provided with an electrode is used as the substrate, and a monomolecular film is formed on this film. Thus, a liquid crystal alignment film having further excellent alignment regulation force can be produced.

Next, a method for producing a liquid crystal display apparatus comprises the method for producing an alignment chemisorption monomolecular film of the present invention, wherein, in the process (A), the base material is one substrate provided with one electrode group in which electrodes are arranged in a matrix array, and the surface provided with an electrode group is brought into contact with the silane-based surfactant, and that a process (E) is included in addition to the processes (A) and (B). The process (E) comprises the steps of facing the surface having the electrode group of the above-mentioned one substrate and another substrate at a predetermined interval, positioning the both substrates, and injecting a liquid crystal composition between them.

It is preferable that in the process (A), a film comprising SiO groups is formed on at least the surface provided with the electrode group of the one substrate, and a monomolecular film that is a liquid crystal alignment film is formed on this film for the same reasons as the mentioned above.

Furthermore, in the process (E), the above-mentioned another substrate may have another electrode or electrode group, and the process (E) may comprise the step of facing the surface having the electrode or electrode group of the above-mentioned one and another substrates.

In the method for producing a liquid crystal display apparatus of the present invention, the above-mentioned one substrate and another substrate are, in general, faced with each other via spacers and are fixed by adhesive.

It is preferable in the method for producing a liquid crystal alignment film of the present invention that in the process (A), the silane-based surfactant comprises photosensitive groups, and the process (B) comprises the steps of performing a first alignment of the fixed molecules constituting the monomolecular film, and then irradiating the monomolecular film with light so as to fix the state of the first alignment by polymerizing or crosslinking the photosensitive groups with each other.

It is preferable in the method for producing a liquid crystal alignment film of the present invention that the process (B) comprises the step of irradiating the monomolecular film, in which the state of a first alignment is fixed, with polarized light, thereby performing a second alignment of the first alignment silane-based surfactant molecules, and fixing the second alignment state by polymerizing or crosslinking the photosensitive groups at the same time. Thus, a liquid crystal alignment film having a further improved alignment property can be produced.

It is preferable that the irradiation of patterned polarized light is carried out twice or more in the step of irradiation with polarized light so as to polymerize the fixed molecules constituting the monomolecular film so that a plurality of patterned sections have different alignment directions in the respective pixels. Thus, a multi-domain type liquid crystal display apparatus with excellent display properties can be produced.

It is preferable in the method for producing a liquid crystal display apparatus of the present invention that the method comprises the step of forming a monomolecular film by chemical adsorption so that liquid crystal is aligned while being twisted at 90°. Thus, the twist-nematic (TN) type liquid crystal display apparatus excellent in display property can be produced.

In the method for producing a liquid crystal display apparatus of the present invention, by using an inplane switching system (IPS) thin film transistor (TFT) array substrate provided with facing electrodes on one side of its surface as the first substrate, IPS liquid crystal display apparatus with excellent visible display properties can be produced.

DETAILED DESCRIPTION OF THE INVENTION

Hereinafter, the present invention will be described by way of embodiments with reference to drawings.

Embodiment A-1

Figure 1:
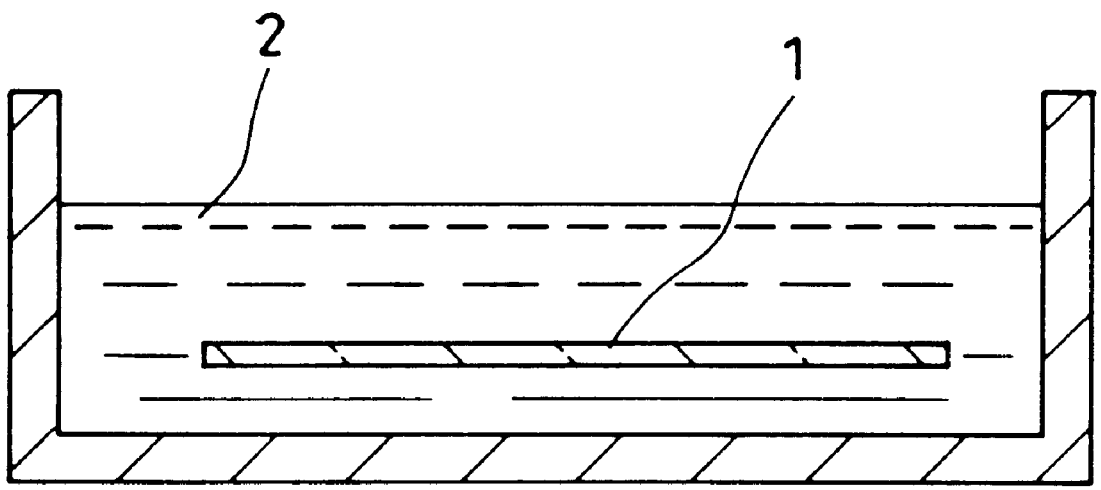
FIG. 1 is a cross-sectional view showing a state in which a substrate is immersed in a chemisorption solution in one Example of the present invention.
Figure 2:
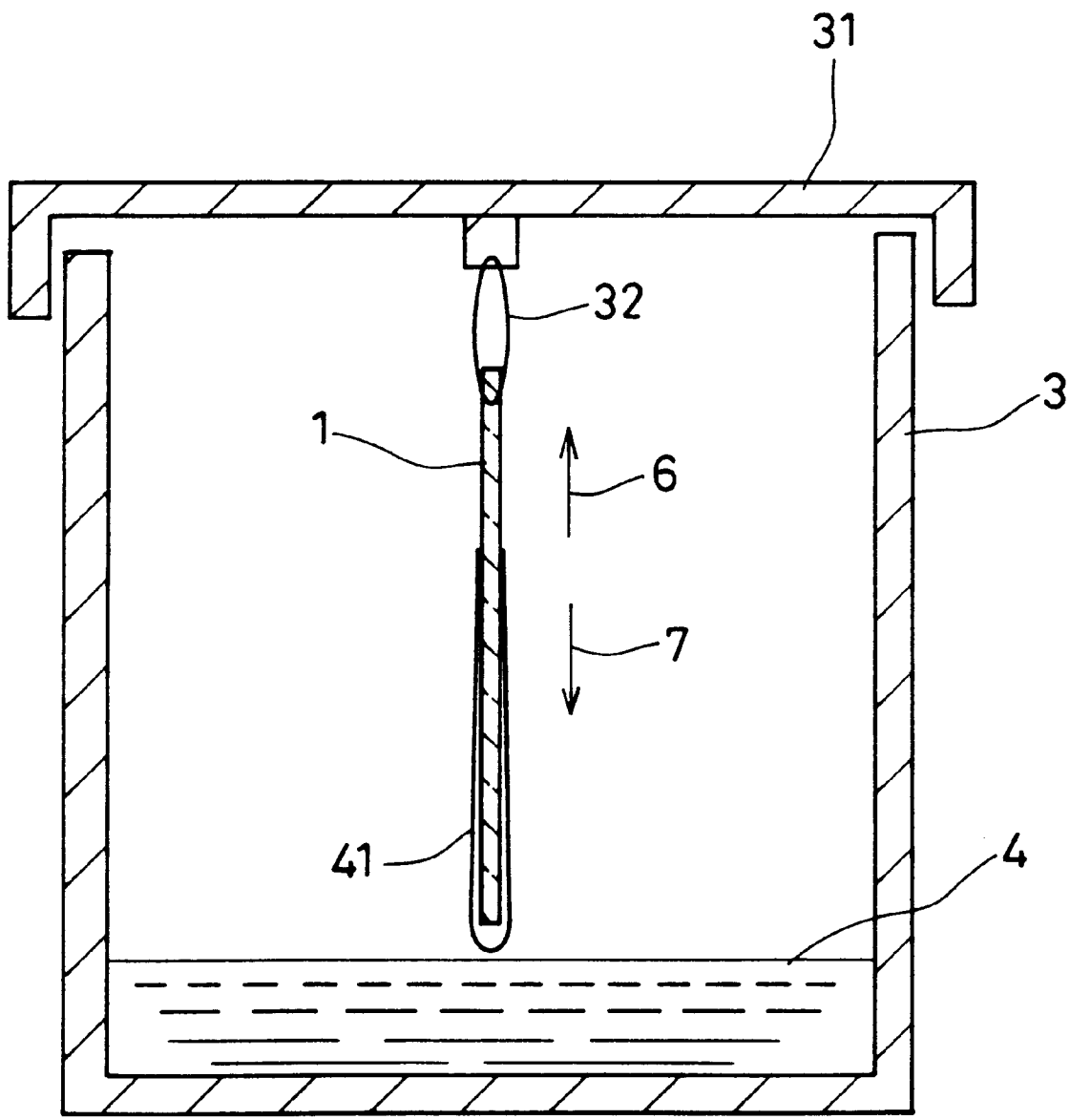
FIG. 2 is a cross-sectional view to explain a step of vapor washing in the above-mentioned Example.

A glass substrate comprising a large number of hydroxyl groups on its surface was prepared, and washed and degreased sufficiently. Meanwhile, a chemisorption solution was prepared by dissolving a silane-based surfactant comprising linear carbon chains having a functional group (e.g. methyl group) controlling the surface energy of a film at the terminal and Si into a nonaqueous solvent (solvent containing no water). As the silane-based surfactant, for example, octadecyltrichlorosilane represented by the general formula: $CH_3(CH_2)_{17}SiCl_3$ can be used. By dissolving this into sufficiently dehydrated octamethyl silicone (bp.100° C.) in a concentration of 1 weight %, a chemisorption solution can be prepared. Moreover, for the non-aqueous solution, other than the octamethyl silicone, any non-aqueous organic solvent having a boiling point up to about 250° C. was practically usable without any problems, although the evaporation time was more or less longer. Then, as shown in FIG. 1, the substrate 1 was immersed in the chemisorption solution 2 in a dry atmosphere (relative humidity of 30% or less) for about two hours. Alternately, the chemisorption solution 2 may be applied to the substrate 1. Thereafter, the glass substrate 1 was lifted from the chemisorption solution 2, and rinsed with a sufficiently dehydrated nonaqueous solvent (chloroform) in the same dry atmosphere as the above. Next, as shown in FIG. 2, the substrate 1 was hung from the center of a lid 31 with a hanger 32, and the substrate 1 in this state was placed into a vapor washing bath 3. Then, the substrate 1 was washed in vapor of an organic solvent 4 (ethanol) for washing for about 10 minutes. Furthermore, the temperature of the organic solvent for washing at the time of vapor washing was set to be approximately in the range from 80 to 85° C. Moreover, in the present invention, the temperature of the organic solvent for the vapor washing is not particularly limited. However, it is preferable that the organic solvent is heated to the temperature of not less than the boiling point of the organic solvent because a large amount of vapor can be generated. In this vapor washing, as shown in FIG. 2, condensation of the organic solvent was formed on the surface of the substrate 1 and flowed in the direction shown by arrow 7. In FIG. 2, numeral 41 is condensation of the organic solvent for washing; and 6 is arrow showing the direction in which the substrate was hung. After this vapor washing, the substrate 1 was taken out from the vapor washing bath 3 and exposed to the air containing moisture.

Figure 3:
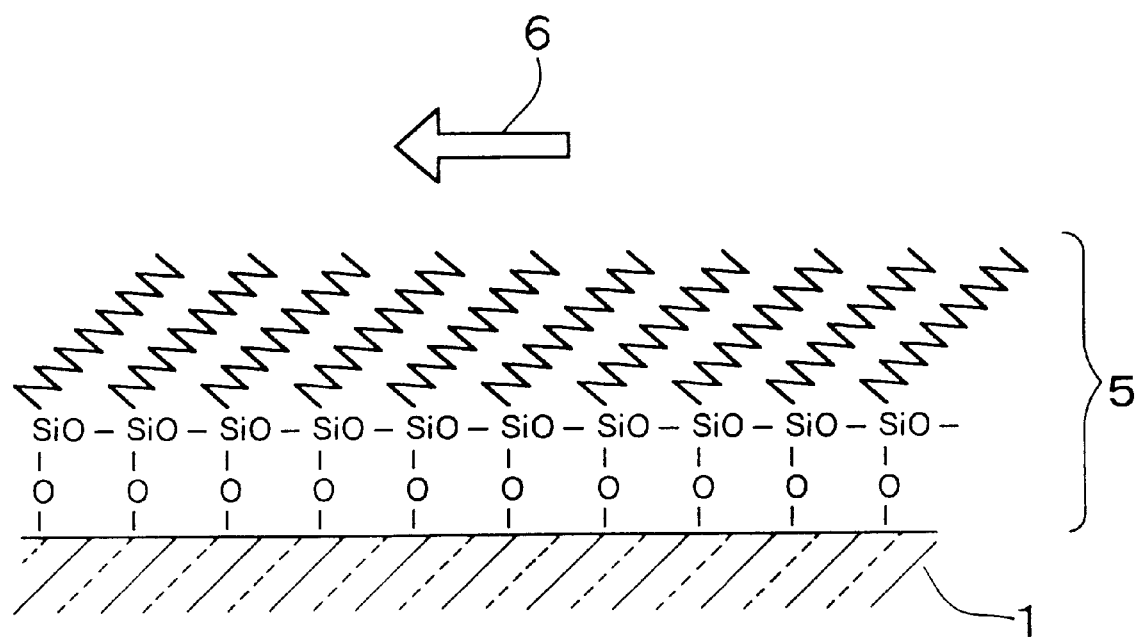
FIG. 3 is a schematic view showing an alignment state of molecules constituting a chemisorption monomolecular film in the above-mentioned Example.

By the above-mentioned treatment, a chemisorption monomolecular film comprising the chlorosilane-based surfactant molecules fixed on the surface of the substrate was produced on the surface comprising hydroxyl groups of the substrate 1. FIG. 3 shows this chemisorption monomolecular film. As shown in FIG. 3, a chemisorption monomolecular film 5 is formed by bonding one end of the silane-based surfactant molecules to the surface of the substrate 1 via a siloxane bond accompanied by a dehydrochloric acid reaction. Molecules constituting the chemisorption monomolecular film 5 are aligned while being tilted in to direction opposite to the direction 6 in which the substrate is hung. When the critical surface energy of the chemisorption monomolecular film 5 was measured by Zisman plot, it was about 25 mN/m. Furthermore, the film thickness of the chemisorption monomolecular film 5 was about 5 nm. Moreover, the film thickness of the chemisorption monomolecular film is usually in the range from 1 to 3 nm in the present invention.

Furthermore, in order to confirm the alignment direction of the molecules constituting the chemisorption monomolecular film (hereinafter, "the constituent molecules" also will be used), two of the substrates 1 were set in such a manner in which the chemisorption monomolecular films 5 were facing each other, so as to assemble a liquid crystal cell having a 20 μm gap. Thereafter, nematic liquid crystal (ZLI4792 manufactured by Merck & Co., Inc.) was injected into the gap between both substrates. When the alignment state of the liquid crystal molecules was observed via a polarizing plate, it was confirmed that the liquid crystal molecules were clearly uniformly aligned along the direction of flow of the condensation of the organic solvent for washing (ethanol) formed on the surface of the substrate. Furthermore, when the tilt of carbon chains constituting the chemisorption monomolecular film was analyzed by the use of Fourier-transform infrared spectrophotometer (FTIR), similar to the above, it was confirmed that the molecules constituting the chemisorption monomolecular film were aligned while being tilted to some degree to the direction in which the organic solvent for washing flowed. This means that the chemically adsorbed silane-based surfactant molecules were aligned by the flow of the condensation of the organic solvent for washing (ethanol) formed on the surface of the substrate in the vapor washing. The alignment direction is a direction in which condensation of the organic solvent for washing flows.

On the other hand, the substrate that was subjected to the same treatment with a chemisorption solution was washed by dipping at room temperature with the same organic solvent (ethanol) and lifted from the organic solvent (washing solution). As a result, the molecules constituting the chemisorption monomolecular film of the substrate were aligned to some degree in the direction opposite to the lifting direction, namely, the direction in which the solution had been drained off. However, a large number of disclinations occurred, and the alignment level was inferior to that obtained by the vapor washing. This is thought to occur because the vapor washing was carried out by using high temperature vapor, so that the high temperature organic solvent that was condensed on the surface of the substrate constantly flowed along the surface of the substrate in one direction, enhancing the alignment effect.

Moreover, in this Embodiment, the time of the vapor washing was 10 minutes. However, it was confirmed that the longer the washing time was, the better the alignment property became. However, from the viewpoint of practical utility, an appropriate washing time is 5 minutes to 6 hours. A more appropriate washing time is 10 to 30 minutes, although it depends on the conditions of the vapor washing.

Furthermore, the surface of the substrate and the silane-based surfactant were reacted as follows: first, a bond represented by the following formula (1) was produced; and then a bond represented by the following formula (2) was produced by exposing the substrate to the air containing moisture after the vapor washing with an organic solvent so as to react the silane-based surfactant bonded to the surface of the substrate with moisture in the air. Moreover, in the following formulae (1) and (2), X denotes a substrate. The same is true in the formulae (5), (6), (7), (8), and (9) which will be described hereinafter.

(Chemical Formula 1)

(Chemical Formula 2)

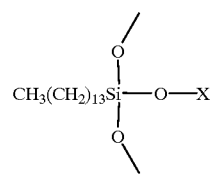

By using at least one functional group selected from the group consisting of a trifluoromethyl group, a methyl group, a vinyl group, an allyl group, an ethynyl group, a phenyl group, an aryl group, a halogen group, an alkoxy group, a cyano group, an amino group, a hydroxyl group, a carbonyl group, an ester group and a carboxyl group at the terminal of or inside the silane-based surfactant molecule, the surface energy of the obtained alignment chemisorption monomolecular film was able to be controlled in the range from 8 to 53 mN/m.

Furthermore, as the organic solvent for vapor washing, organic solvent comprising halogen, ether-based organic solvent, ketone-based organic solvent, alcohol-based organic solvent, hydrocarbon-based organic solvent, silicone-based organic solvent, or the like, was usable. However, the solvent having the boiling point of about 50 to 250° C. was easy to handle. In particular, nonaqueous organic solvents having a boiling point of the above range and containing no water, for example, low molecular weight organic silicone solvent such as chloroform, hexane, toluene, xylene, hexamethyldisiloxane, etc., are inactive with respect to a chlorosilyl group, an alkoxysilyl group and an isocyanate silyl group. Therefore, the effect of the vapor washing was good.

Furthermore, as the nonaqueous organic solvent for preparing the chemisorption solution, an organic solvent comprising alkyl groups, an organic solvent comprising carbon fluoride groups, an organic solvent comprising carbon chloride groups and organic solvent comprising siloxane groups, or the like, were usable. However, also in this case, a solvent having a boiling point of about 50 to 250° C. was easy to handle.

Embodiment A-2

A glass substrate comprising a large number of hydroxyl groups on its surface was prepared, and washed and degreased sufficiently. Meanwhile, as the silane-based surfactant comprising linear carbon chains having a functional group controlling the surface energy of the monomolecular film and Si, a silane-based surfactant represented by a general formula: $CH_3(CH_2)_{13}SiCl_3$ and a silane-based surfactant represented by the following general formula (3) were mixed at a mole ratio of 1:1 and used, and dissolved in a sufficiently dehydrated nonaqueous solvent (hexadecane) in a concentration of 1 weight %. Thus, a chemisorption solution was prepared.

(Chemical Formula 3)

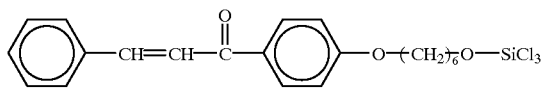

The substrate was immersed in the chemical solution for two hours in the same dry atmosphere as the above, then the substrate was lifted from the chemisorption solution, and then placed in the vapor washing bath of chloroform as in Embodiment A-1 and washed for about 25 minutes. Thereafter, the substrate was taken out from the vapor washing bath and exposed to air containing moisture. Then, the entire surface of the chemisorption monomolecular film formed on the surface of the substrate was irradiated with UV light of 365 nm at a strength of 200 mJ/cm².

By the above-mentioned treatments, i.e., by the above-mentioned reaction in which the two silane-based surfactants were mixed in the ratio of 1:1 and used, the chemisorption monomolecular film was formed on a part of the surface having hydroxyl groups of the glass substrate. One end of the molecules constituting the chemisorption monomolecular film was chemically bonded to the surface of the substrate via a covalent siloxane bond. Furthermore, photosensitive groups (chalcone groups) represented by the following general formula (4) of the constituent molecules were polymerized or crosslinked with each other, so that the constituent molecules were fixed with each other. The film thickness of the chemisorption monomolecular film was about 1.9 nm. When the critical surface energy of the chemisorption monomolecular film was measured by the use of Zisman plot, it was about 28 mN/m.

(Chemical Formula 4)

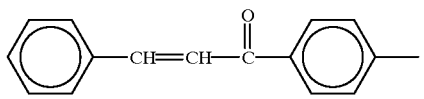

In order to determine the alignment direction of the molecules constituting the chemisorption monomolecular film, two substrates were set in such a manner in which the chemisorption monomolecular films were facing each other, so as to assemble a liquid crystal cell having a 20 μm gap. Thereafter, nematic liquid crystal (ZLI4792 manufactured by Merck & Co., Inc.) was injected into the gap between both substrates. When the aligning state of the liquid crystal molecules was observed via a polarizing plate, it was confirmed that the liquid crystal molecules were uniformly aligned with a pre-tilt angle of 1.3° along the direction of flow of the condensation of the organic solvent for washing (chloroform) formed on the surface of the substrate. Furthermore, when the tilt of carbon chains constituting the chemisorption monomolecular film was analyzed by FTIR, it was confirmed that, similar to the above, the carbon chains were aligned while being tilted to some degree in the direction in which the organic solvent for washing flowed. This means that the chemically adsorbed silane-based surfactant molecules were aligned by the flow of the condensation of the organic solvent for washing (chloroform) formed on the surface of the substrate. The alignment direction is a direction in which the condensation of organic solvent for washing flows.

Furthermore, when the heat resistance of alignment was determined, it was about 180° C. for the chemisorption monomolecular film in Embodiment A-1, and it was about 245° C. in this embodiment. It was confirmed that the heat resistance of alignment was improved in this embodiment.

Moreover, in this embodiment, it can be thought that the reaction between the silane-based surfactant molecules and the surface of the substrate proceeds as the below mentioned formulae (5), (6), (7), and (8). In other words, first, the bonds represented by the formulae (5) and (7) were produced in the mole ratio of about 1:1, and then bonds represented by the following formulae (6) and (8) were produced by exposing the substrate to air containing moisture after the vapor washing with an organic solvent so as to react the silane-based surfactant bonded to the surface of the substrate with water in the air.

(Chemical Formula 5)

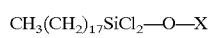

(Chemical Formula 6)

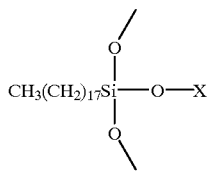

(Chemical Formula 7)

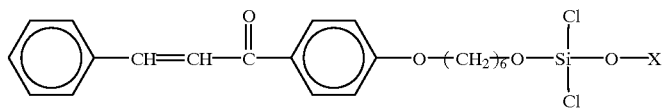

(Chemical Formula 8)

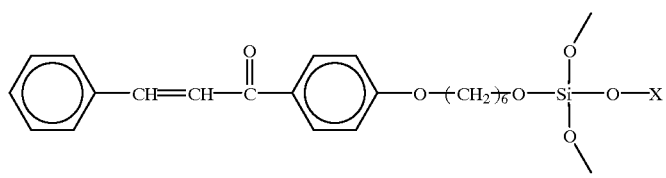

In this embodiment, when a silane-based surfactant comprising a photosensitive group, at least one molecular chain from a linear carbon chain and a siloxane bond chain, and at least one functional group selected from the group consisting of a chlorosilyl group, an alkoxysilyl group and an isocyanate silyl group was used as the silane-based surfactant, the same chemisorption monomolecular film was able to be manufactured.

Furthermore, the silane-based surfactant comprising a cinnamoyl group, a chalcone group, a methacryloyl group or a diacetylene group as the photosensitive group had little photoabsorption in the visible region, had transparency and had photoabsorption in the range from 25 to 400 nm, so that it was sensitive to i rays (ultraviolet ray of 365 nm). Therefore, it was practically useful.

Embodiment A-3

In this case, a silane-based surfactant represented by the general formula: $ClSi(CH_3)_2OSi(CH_3)_2OSi(CH_3)_2OSi(CH_3)_2Cl$ was used in place of a silane-based surfactant represented by the general formula: $CH_3(CH_2)_{13}SiCl_3$ in Embodiment A-2. Moreover, the mixing mole ratio of this silane-based surfactant to the silane-based surfactant represented by the above-mentioned formula (3) was changed in the range from 1:0 to 0:1. As a result, the critical surface energy of the obtained chemisorption monomolecular film was able to be controlled in the range from 37 mN/m to 23 mN/m in accordance with the mixing mole ratio. Furthermore, a liquid cell was assembled, then liquid crystal was injected therein and the alignment property of the liquid crystal molecules was confirmed. As a result, the pre-tilt angle of the liquid crystal molecules was different, but the alignment direction was substantially the same as the results of Embodiment A-2.

In this embodiment, a silane-based surfactant comprising, at least one molecular chain from a linear carbon chain and a siloxane bond chain, and at least one functional group selected from the group consisting of a chlorosilyl group, an alkoxysilyl group and an isocyanate silyl group was used for the silane-based surfactant, and the same chemisorption monomolecular film was able to be produced.

Embodiment A-4

In Embodiment A-1, prior to the formation of the chemisorption monomolecular film, a solution in which an inorganic compound comprising chlorosilyl groups was dissolved was applied to the surface of the substrate in a dry atmosphere (relative humidity of 30% or less) and dried. Then, the solvent was evaporated from the solution and inorganic compound comprising chlorosilyl groups was concentrated. Finally, a film of the compound comprising chlorosilyl groups was formed on the surface of the substrate. At the time of the formation of this film, a dehydrochloric acid reaction between hydroxyl groups contained in the surface of the substrate and chlorosilyl groups in the film rapidly proceeded Thereafter, the substrate was washed in nonaqueous solution containing little moisture and exposed to the air. Chlorosilyl groups in the film on the surface of the substrate were reacted with moisture in the air. Thus, the film (monomolecular film) made of inorganic siloxane comprising a large number of hydroxyl groups was formed.

Figure 4:
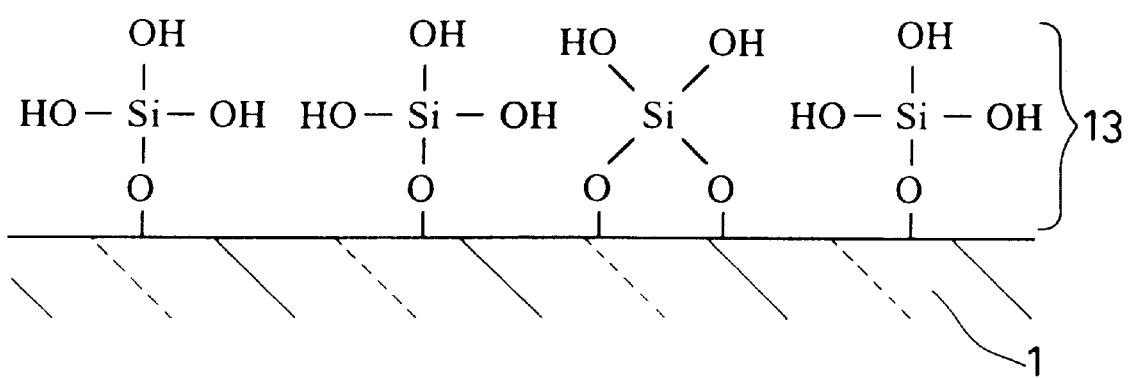
FIG. 4 is a schematic view showing a state in which a siloxane film is formed on the surface of the substrate in another Example of the present invention.

An adsorption solution (concentration: 1 weight %) was prepared by dissolving, for example, a compound represented by the general formula: $SiCl_4$ as the compound comprising chlorosilyl groups in a dehydrated toluene. The substrate was immersed in this adsorption solution in the above-mentioned dry atmosphere for about 1 minute, then lifted from the solution and dried in the above-mentioned dry atmosphere over about 5 minutes, so as to evaporate toluene. Further, the reaction was carried out for 5 minutes. Thereafter, the substrate was washed with sufficiently dehydrated chloroform, causing a dehydrochloric acid reaction between the hydroxyl groups on the surface of the substrate and chlorine of the compound. Consequently, a film (monomolecular film) formed on the surface of the substrate via siloxane (—SiO—) bond. Thereafter, when the substrate was exposed to the air so as to cause a reaction with moisture in the air, a siloxane film 13 (monomolecular film) comprising a large number of hydroxyl groups on its surface was formed on the surface of the substrate 1 via siloxane (—SiO—) bonds as shown in FIG. 4.

Moreover, since the thus obtained siloxane film was bonded to the substrate via the chemical bonds of siloxane (—SiO—), it was not peeled off. Furthermore, the obtained siloxane film had a large number of Si—OH bonds on its surface. In particular, the hydroxyl groups were generated in a number about twice to three times the original number of hydroxyl groups on the surface of the substrate. Therefore, hydrophilicity of the surface of the substrate was extremely enhanced.

When the treatment with a chemisorption solution as in Embodiment A-1 was carried out via the siloxane film, a chemisorption monomolecular film that is excellent in alignment property was formed on the siloxane film the same as the above. This chemisorption monomolecular film was chemically bonded to the siloxane film via the covalent bond of siloxane. Furthermore, the film thickness of the chemisorption monomolecular film was about 1.6 nm. The reason why the film thickness of the chemisorption monomolecular film obtained in this Embodiment was slightly thicker than that obtained by Embodiment A-1 is thought because the hydrophilicity of the surface of the substrate was improved by the siloxane film, so that the density of the constituent molecules was higher than that of the chemisorption monomolecular film obtained by Embodiment A-1.

Moreover, as the compound comprising chlorosilyl groups, in addition to the compound represented by the general formula: $SiCl_4$, a compound represented by the general formula: $Cl-(SiCl_2O)_n-SiCl_3$ was able to be used. Moreover, in the above-mentioned formula, n denotes positive integer. When n was 1 to 3, the compound was easy to handle.

Embodiment B-1

A liquid crystal alignment film was prepared as follows. First, a glass substrate (comprising a large number of hydroxyl groups on its surface) provided with transparent (indium oxide, ITO) electrodes on its surface was prepared and washed and degreased sufficiently beforehand. Next, $SiO_2$ film was formed on the entire surface to about 100 nm in thickness by sputtering $SiO_2$ at $2\times10^{-3}$ torr so that $SiO_2$ covered the ITO electrode.

On the other hand, a chemisorption solution was prepared by dissolving a silane-based surfactant (hereinafter, "chemisorption material" will also be used) comprising a photosensitive group, a linear carbon chain (hydrocarbon group etc. may be used) and Si in a sufficiently hydrated nonaqueous solvent (hexadecane etc.) in a concentration of 1 weight %. As the silane-based surfactant, the material represented by the general formula (3) was used. In the silane-based surfactant, a part represented by the general formula (4) is a photosensitive group (a chalcone group).

Then, as shown in FIG. 1, the substrate 1 was immersed in the chemisorption solution 2 in a dry atmosphere (relative humidity of 30% or less) for about 1.5 hours. Alternately, the chemisorption solution 2 may be applied to the substrate 1. Thereafter, the substrate 1 was lifted from the chemisorption solution 2 and rinsed with a nonaqueous solvent (chloroform).

Then, as shown in FIG. 2, the substrate 1 was hung from the center of a lid 31 by using a hanger 32 substantially in the direction perpendicular to the lid 31, and the substrate was placed in the vapor washing bath 3 in this state. At this time, as the washing solution 4, chloroform, a nonaqueous organic solvent was used. In the vapor washing bath 3, the washing solution was evaporated and the vapor was formed into condensation on the surface of the substrate 1. In FIG. 2, numeral 41 is condensation of the washing solution (organic solvent). The condensation of the washing solution flowed in the direction shown by arrow 7, that is, in the opposite direction to that shown by arrow 6 in which the substrate was hung (i.e. downward). This vapor washing was carried out for about 20 minutes. Furthermore, chloroform used for the vapor washing was heated to 62 to 67° C. Moreover, in the present invention, the temperature of the organic solvent for vapor washing is not particularly limited. However, it is preferable that the organic solvent is heated to the temperature of not less than the boiling point of the organic solvent used for vapor washing because a large amount of vapor can be generated.

Figure 5:
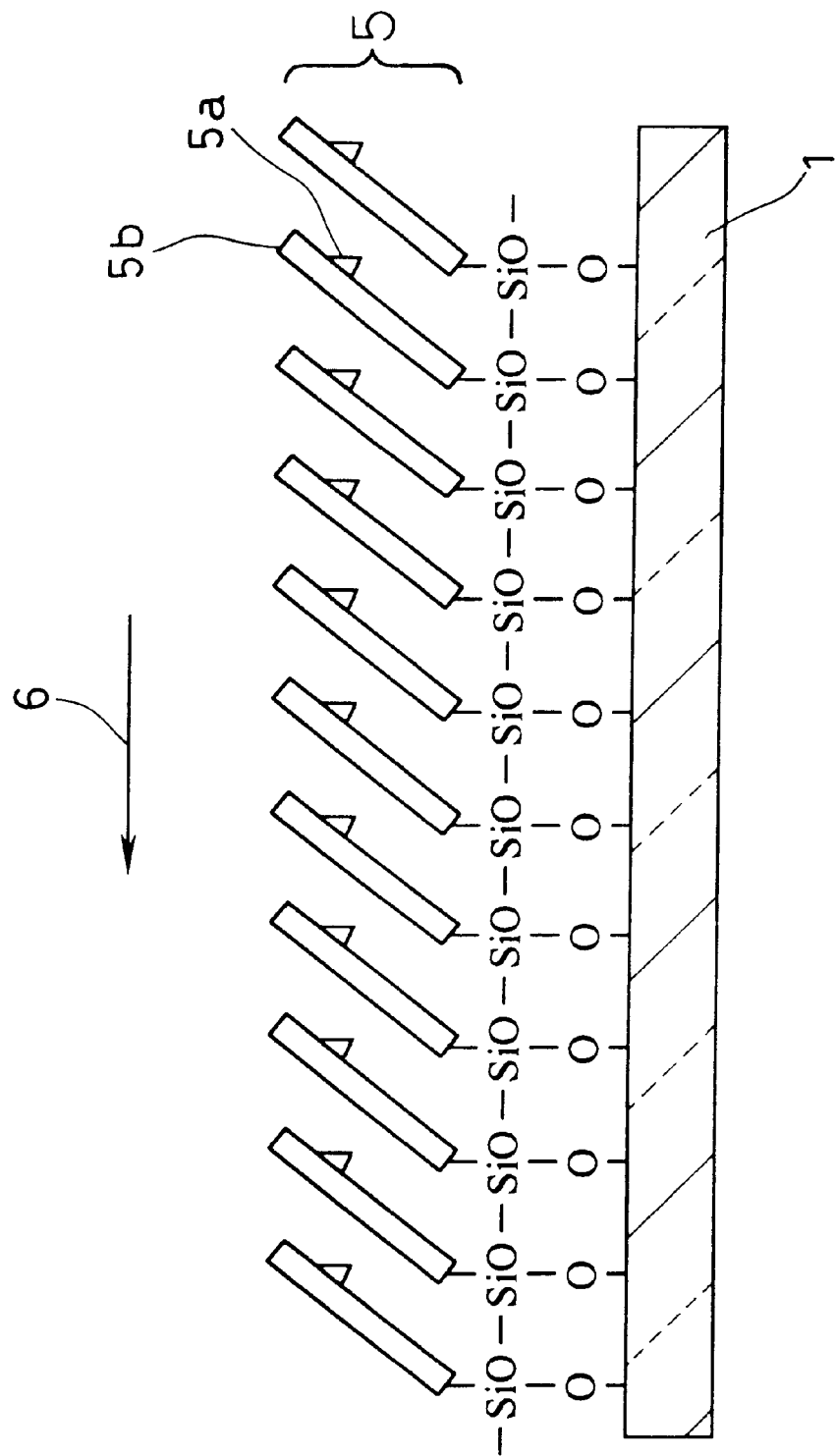
FIG. 5 is a schematic view showing an alignment state of molecules constituting a chemisorption monomolecular film on the surface of the substrate in a further Example of the present invention.

After the vapor washing, the substrate 1 was exposed to air containing moisture. As a result, as shown in FIG. 5, the surfactant was reacted with the substrate 1, and thereby a monomolecular film 5 was formed to the thickness of about 1.8 nm. In FIG. 5, 5b denotes a silane-based surfactant molecule that was reacted and fixed; and 5a denotes a photosensitive group, respectively. The same numbers are given to the same parts as in FIGS. 1 to 4. Moreover, the film thickness of the monomolecular film is usually in the range from 1 to 3 nm.

When the surface of the substrate 1 was analyzed by Fourier-transform infrared spectrophotometer (FTIR), one end of the silane-based surfactant molecules was chemically bonded by a dehydrochlolic acid reaction between hydroxyl groups and chlorosilyl groups and fixed to the surface of the substrate 1 (hereinafter, for the surfactant molecules that are bonded and fixed at one end, "bonded and fixed molecules" also will be used). Also, the surfactant molecules were aligned in the direction opposite to the direction in which the substrate was hung in vapor washing, that is, the direction in which the condensation of the organic solvent formed on the surface of the substrate 1 flowed.

Moreover, in this Embodiment, the chemical formula 7 shows a chemical bond generated by the dehydrochloric acid reaction between the $SiCl_3$ groups of the silane-based surfactant and hydroxyl groups on the surface of the substrate in the surface of the substrate 1 in the above-mentioned series of process. Furthermore, the chemical formula (8) shows the state after the silane-based surfactant molecules bonded to the surface of the substrate 1 were reacted with moisture in the air.

Next, two of the thus obtained substrates 1 were set in such a manner in which the chemisorption monomolecular films (liquid crystal alignment films) 5 were facing inward, so as to assemble a liquid crystal cell having a 20 $\mu$m gap so that the exposed portions of the monomolecular films were oriented anti-parallel to each other. Thereafter, nematic liquid crystal (ZLI4792 manufactured by Merck & Co., Inc.) was injected into the gap between both substrates. When the alignment state of the liquid crystal was observed, some disclinations were observed, but the injected liquid crystal molecules were aligned with a pre-tilt angle of 1° along the molecules constituting the liquid crystal alignment film 5 in the direction 7 in which condensation of the organic solvent formed on the surface of the substrate 1 flowed.

Moreover, when the liquid crystal alignment film 5 was analyzed by FTIR, the alignment anisotropy of carbon hydrogen chains was confirmed. Further, it was confirmed that the alignment direction of carbon hydrogen chains is substantially corresponds to the alignment direction of the liquid crystal.

As mentioned above, in this Embodiment, by vapor washing the substrate in the state in which the substrate was hung perpendicularly, the alignment direction of the molecules constituting the monomolecular film formed on the surface of the substrate was able to be controlled by the flow of condensation of the organic solvent formed on the surface of the substrate. Furthermore, it was confirmed that the thus formed monomolecular film served as a liquid crystal alignment film.

Moreover, in this Embodiment, the silane-based surfactant (including photosensitive groups) represented by the general formula (3) was used. However, chemisorption material comprising no photosensitive groups such as the silane-based surfactant represented by the general formula: $CH_3(CH_2)_{17}SiCl_3$ may be used. When a liquid crystal cell was formed by the use of such a silane-based surfactant, it was confirmed that the pre-tilt angle of the injected liquid crystal was different from the above-mentioned pre-tilt angle, but the alignment property was the same. Furthermore, in this Embodiment, as the organic solvent for vapor washing, nonaqueous chloroform was used, but the present invention is not limited to this alone. If rinsing with a nonaqueous solution such as chloroform is sufficiently carried out, even if the vapor washing was carried out by the use of hydrophilic organic solvent such as ethanol, etc., the same effect was obtained.

Embodiment B-2

Figure 6:
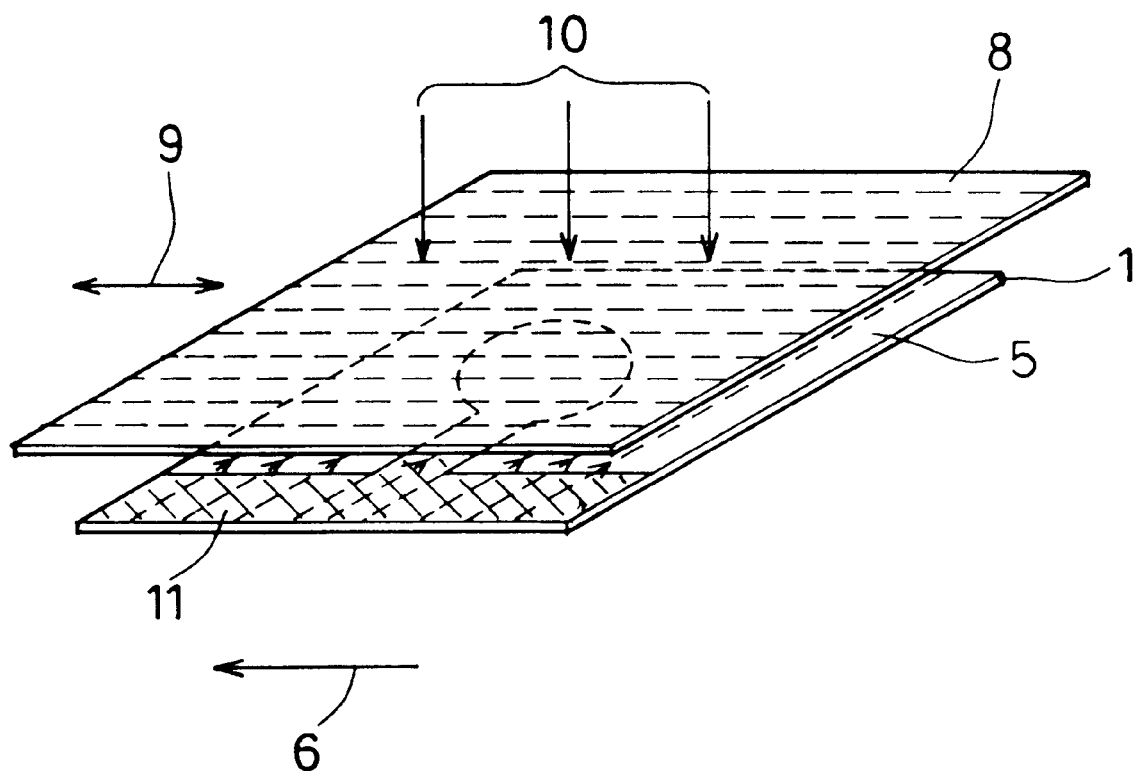
FIG. 6 is a schematic view showing a step of the irradiation with light of a further Example of the present invention.

In this Embodiment, irradiation with light was carried out in order to improve the alignment property and heat resistance of the liquid crystal alignment film. In other words, first, the monomolecular film 5 was formed and an aligning treatment (a vapor washing treatment) was carried out as in Embodiment B-1. Thereafter, as shown in FIG. 6, a polarizing plate 8 (HNP'B, manufactured by POLAROID) was used and disposed so that the polarizing direction 9 was substantially parallel to the direction 6 in which the substrate 1 was hung (in this Embodiment, it was dislocated by 4° with respect to the hanging direction, but may be disposed completely in parallel). Then, ultraviolet rays 10 (UV rays) having a wavelength of 365 nm was radiated at 100 mJ/cm² by using an extra-high pressure mercury lamp. In FIG. 6, numeral 11 is a transparent electrode, and the same numbers are given to the same parts as in FIGS. 1 to 5.

Figure 7:
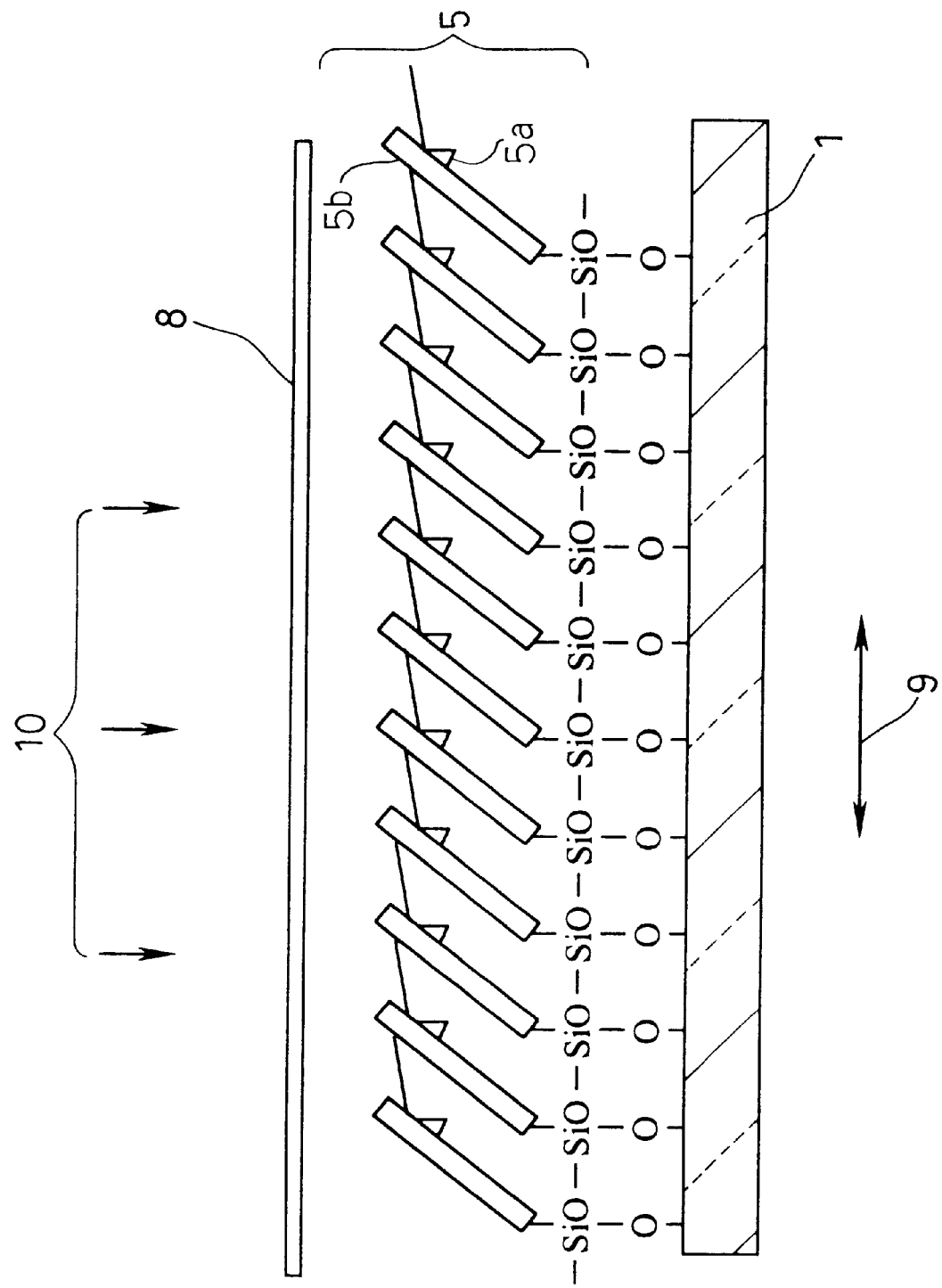
FIG. 7 is a schematic view showing an alignment state of molecules constituting a chemisorption monomolecular film on the surface of the substrate in the above-mentioned Example.

When the liquid crystal alignment film that was subjected to the abovementioned treatment was analyzed by FTIR, it was confirmed that, as shown in FIG. 7, in a part of the chemisorption monomolecular film (liquid crystal alignment film) 5 that was irradiated with the polarized UV rays 10, the constituent molecules were realigned in the polarizing direction 9 and at the same time the photosensitive groups 5a were polymerized or crosslinked and the molecules 5b were fixed with each other. In FIG. 7, the same numbers are given to the same parts as in FIGS. 1 to 6. Furthermore, the following chemical formula (9) shows the polymerization or crosslinking of the silane-based surfactant molecules. In this formula, Y and Z represent the other neighboring silane-based surfactant molecules.

(Chemical Formula 9)

liquid crystal molecules were aligned with a pre-tilt angle of 1° with respect to each substrate along the molecules constituting the liquid crystal alignment film. Furthermore, the results corresponded well to the analyzed results by FTIR. Moreover, in this case, the heat resistance and stability of the alignment was improved to about 250° C., which had been about 200° C. before the irradiation with UV rays. The reason for this was thought to be that the molecules constituting the monomolecular film was polymerized and crosslinked by the irradiation with UV rays.

As mentioned above, in this Embodiment, by irradiating the monomolecular film in which the constituent molecules had been preliminarily aligned with polarized light, the alignment direction of the constituent molecules was able to be controlled in the polarizing direction and, furthermore, the heat resistance of the liquid crystal alignment film was able to be improved In the case where the monomolecular film was irradiated with unpolarized light in place of polarized light, the alignment direction of the molecules constituting a monomolecular film remained in the direction opposite to the direction in which the substrate was hung at the time of vapor washing. Heat resistance of the monomolecular film was about 240° C. Furthermore, when a liquid crystal cell was assembled by the use of monomolecular film, the liquid crystal was aligned in the direction in which the substrate was hung. However, the alignment property was somewhat inferior to that of irradiation with polarized light.

In this Embodiment, when a silane-based surfactant comprising, in place of a chlorosilyl group, at least one group selected from the group consisting of an alkoxysilyl group and an isocyanate silyl group was used, the same results was able to be obtained.

In this Embodiment, although having a different photosensitive wave length range, as the chemisorption material (silane-based surfactant), a silane-based surfactant comprising a cinnamoyl group, a methacryloyl group or a diacetylene group, in place of a chalcone group, was similarly usable.

In this Embodiment, by performing several times of steps of irradiation with patterned polarized light dividing the pixel into a plurality of sections after the molecules constituting the monomolecular film were aligned by vapor washing, a multi-domain type liquid crystal display apparatus was able to be produced.

In this Embodiment, if a silane-based surfactant comprising a siloxane bond chain represented by the general formula

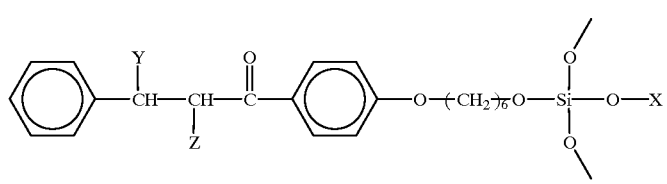

Next, two of the thus obtained substrates 1 were set so that the chemisorption monomolecular films liquid crystal alignment films) 5 were facing inward, so as to assemble a liquid crystal cell having a 20 μm gap so that the exposed portions of the monomolecular films were oriented anti-parallel to each other. Thereafter, nematic liquid crystal (ZLI4792 manufactured by Merck & Co., Inc.) was injected into the gap between both substrates. When the alignment state of the liquid crystal molecules was observed, the injected

(11) is used in place of a linear carbon chain represented by the general formula (10) as the silane-based surfactant, the liquid crystal alignment film was able to be similarly produced Moreover, in the general formulae (10) and (11), n is a positive integer, and Me denotes a methyl group.

(Chemical Formula 10)

(Chemical Formula 11)

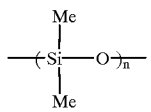

In this Embodiment, a monomolecular film was able to be produced without deactivating the silane-based surfactant by using a solvent comprising at least one group selected from the group consisting of an alkyl group, a carbon fluoride group, a carbon chloride group and a siloxane group.

Embodiment B-3

A liquid crystal cell was produced in the same way as the Embodiment B-1 except that as a chemisorption material (silane-based surfactant), the silane-based surfactant (A) represented by the general formula (3) and a silane-based surfactant (B) represented by the chemical formula: $CH_3(CH_2)_{17}SiCl_3$ were mixed and in the mixing weight ratio of A:B=1:0.1 and A:B=1:0.2 and used, and the same evaluation was performed. As a result, in the silane-based surfactant of the mixing weight ratio of 1:0.1, the pre-tilt angle was 1.5°; and in the silane-based surfactant of the mixing weight ratio of 1:0.2, the pre-tilt angle was 2.1°.

As mentioned above, in the formation of the monomolecular film, plural kinds of silane-based surfactants having different molecular lengths were mixed and used, and a photosensitive group was included in at least one kind of molecule in the mixture of the silane-based surfactant molecules. Consequently, it was confirmed that the monomolecular film served as the liquid crystal alignment film even if the alignment direction of the molecules was fixed in a predetermined direction by polymerizing or crosslinking the photosensitive groups. Furthermore, by changing the composition (the mixing ratio), the pre-tilt angle of the injected liquid crystal was able to be arbitrarily controlled. Furthermore, the silane-based surfactant including siloxane bond chains in place of carbon chains was usable and although having the different pre-tilt angle, the same liquid crystal alignment film was able to be obtained.

In this Embodiment, when the silane-based surfactant comprising, in place of chlorosilyl group, at least one group from an alkoxysilyl group and an isocyanate silyl group was used, substantially the same liquid crystal alignment film was able to be obtained.

By using a silane-based surfactant comprising at least one group selected from the group consisting of a trifluoromethyl group, a methyl group, a vinyl group, an allyl group, an ethynyl group, a phenyl group, an aryl group, a halogen group, an alkoxy group, a cyano group, an amino group, a hydroxyl group, a carbonyl group, an ester group and a carboxyl group at the terminal or a part of the carbon chain or siloxane bond chain, the critical surface energy of the obtained liquid crystal alignment film was able to be controlled, and thereby the pre-tilt angle of the injected liquid crystal was able to be controlled.

Embodiment B-4

A liquid crystal cell was produced in the same way as embodiment B-3 except that as the silane-based surfactant, the first mixture comprising a silane-based surfactant (A) represented by the general formula (3) and a silane-based surfactant (C) represented by the general formula: $CH_3(CH_2)_{17}SiCl_3$, and the second mixture comprising a silane-based surfactant (A) represented by the general formula (3) and a silane-based surfactant (D) represented by the general formula: $CH_3(CH_2)_{13}SiCl_3$ in a mixing weight ratio of A: C=A: D=1:0.1 were used and the same evaluation was performed. As a result, in the case where the first mixture was used, the pre-tilt angle of liquid crystal was 1.1°; and in the case where the second mixture was used, the pre-tilt angle was 0.8°. Thus, by changing the molecular lengths of the silane-based surfactant molecules without changing the composition (the mixing ratio) of the silane-based surfactant mixture, the pre-tilt angle of the liquid crystal was able to be arbitrarily controlled.

Embodiment B-5

A liquid crystal cell was produced in the same way as Embodiment B-3 except that a silane-based surfactant (A) represented by the formula (3) and a silane-based surfactant (E) represented by the general formula: $CF_3(CF_2)_7(CH_2)_2SiCl_3$ were mixed in the mixing weight ratio of A: E=0.2:1 and used, and the same evaluation was performed. As a result, the pre-tilt angle of liquid crystal was 89°. By using the silane-based surfactant including fluorine atom, a liquid crystal alignment film vertically aligned (homeotropic alignment) was able to be produced easily.

Embodiment B-6

In Embodiment B-1, instead of forming an $SiO_2$ film, the surface of the glass substrate provided with ITO electrode was treated with inorganic silane-based chemisorption material comprising a large number of SiCl groups.

Figure 8:
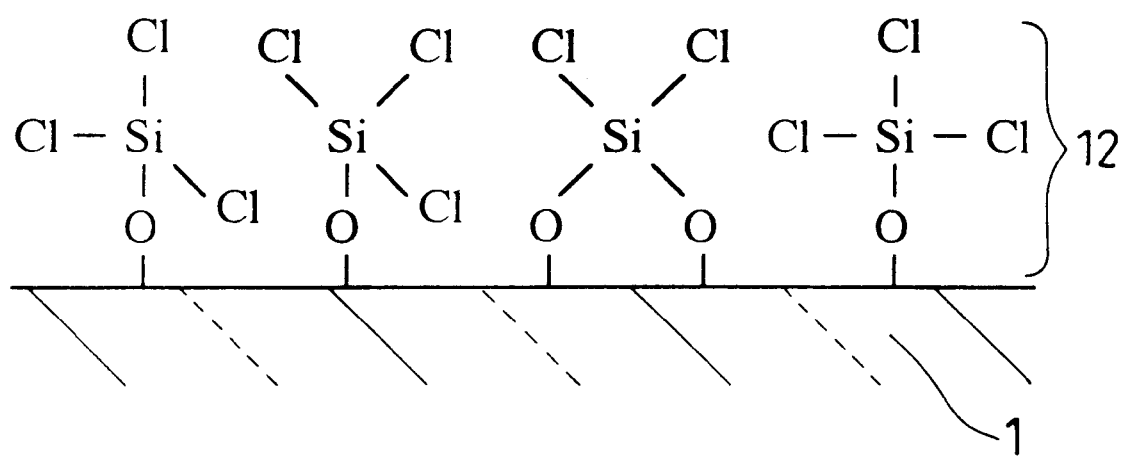
FIG. 8 is a schematic view showing a state in which the surface of the substrate is treated with inorganic silane chemisorption agents in a further Example of the present invention.

The treatment of the inorganic silane-based chemisorption material was carried out as follows. A chemisorption solution was prepared by dissolving the adsorption material represented by the general formula: $SiCl_4$ in the sufficiently dehydrated nonaqueous solvent (hexadecane) in a concentration of 3 weight %, and then the substrate was immersed in the chemisorption solution for 10 minutes in a dry atmosphere (humidity was 5%). In this treatment, since some hydroxyl groups were included on the surface of the glass substrate and on the surface of ITO electrode, a film 12 (monomolecular film) was formed on the surface of the substrate 1 as shown in FIG. 8. Thereafter, when excess adsorption material ($SiCl_4$) was removed by washing the substrate with sufficiently dehydrated cyclohexane and then reacting the substrate with water, a siloxane film 13 (monomolecular film) having a large number of hydroxyl groups was formed both on the glass surface of the substrate 1 and on the surface of ITO electrode as shown in FIG. 4.

Thereafter, the same procedure as in Embodiment B-1 was carried out, and the liquid crystal alignment film (monomolecular film) was formed on the substrate 1 via the siloxane film 13. When the liquid crystal alignment film was analyzed by FTIR, it was confirmed that the liquid crystal alignment film similar to that of the Embodiment B-1 was uniformly formed on the entire surface of the substrate.

Moreover, in the case where the step of treating with inorganic silane-based chemisorption material was omitted, on the glass surface of the substrate, a monomolecular film similar to the above was obtained and the liquid crystal exhibited the fine alignment. However, on the surface of the ITO electrode, the monomolecular film had low molecular density and a large number of defects of alignment of liquid crystal occurred. Accordingly, the liquid crystal alignment film was not for practical use. The cause of this is thought to be that the surface of the ITO electrode has less hydroxyl groups than the glass surface.

In the treatment with the inorganic silane-based chemisorption material, it was confirmed that if the material represented by the general formula: Cl(SiCl$_2$O)$_n$SiCl$_3$ (n denotes integer of 1 to 3) was used in place of an adsorption material represented by the general formula SiCl$_4$, the effect of increasing hydroxyl groups on the surface of the ITO was enhanced. Furthermore, since this material had a boiling point higher than the adsorption material represented by the general formula: SiCl$_4$, it was easy to handle.

Embodiment B-7

This embodiment is an example showing a method for producing a liquid crystal display apparatus using the liquid crystal alignment film.

Figure 9:
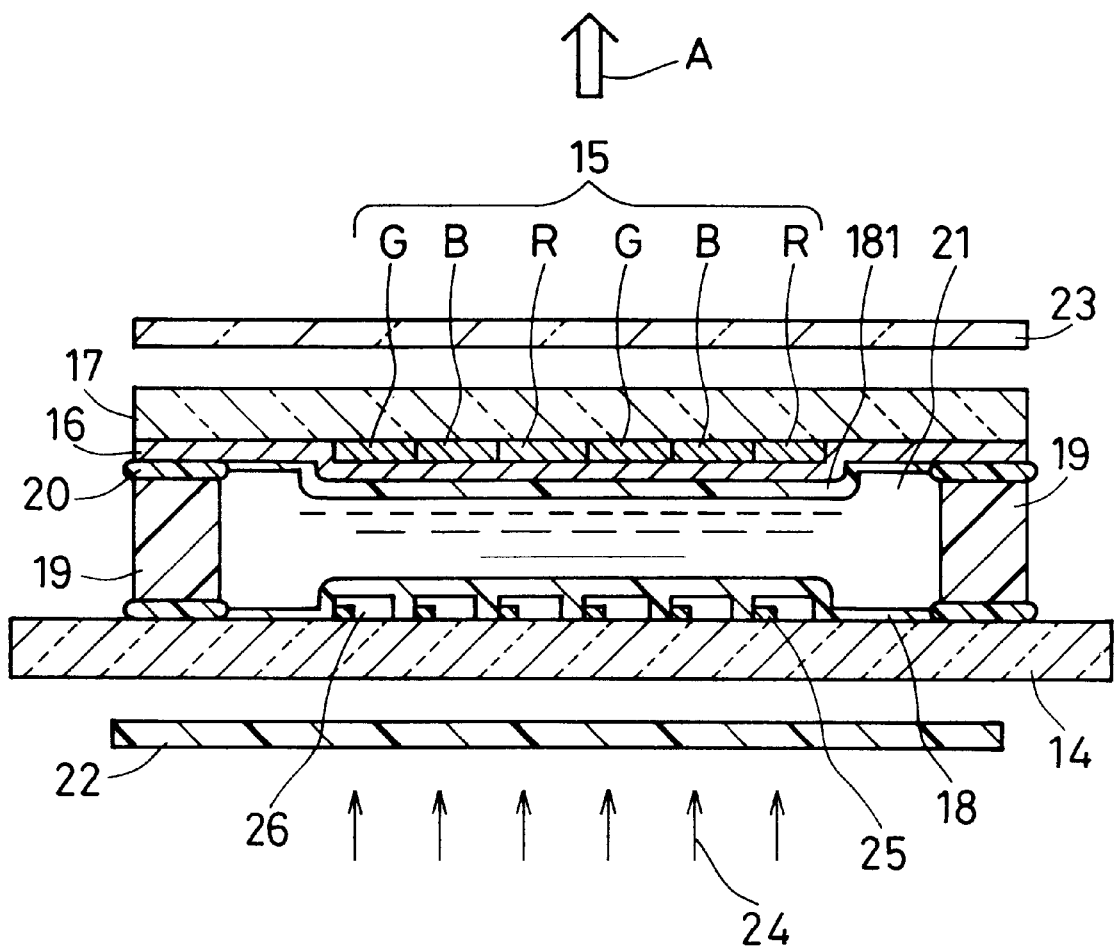
FIG. 9 is a cross-sectional view showing a liquid crystal display apparatus produced by a further Example of the present invention.

First, as shown in FIG. 9, an SiO$_2$ film was formed on a first substrate 14 provided with a first electrode group in which electrodes 26 were arranged in a matrix array and a transistor 25 for driving the electrodes 26. SiO$_2$ film was formed on the substrate 14, and then a monomolecular film (alignment treatment is not performed) was formed on the SiO$_2$ film as in Embodiments B-1 and B-2.

The substrate was washed in vapor with chloroform, as the nonaqueous organic solvent in a state where the substrate was placed in the direction of the gate base line, and thereby the molecules constituting the monomolecular film were made to be preliminarily aligned in the direction opposite to the direction in which the substrate was hung. Thereafter, a polarizing plate HNP'B (manufactured by POLAROID) was used and disposed so that the polarizing direction was substantially parallel to the alignment direction. Then, light having a wavelength of 365 nm (i rays) was radiated (3.6 mJ/cm$^2$ after passing through the polarization plate) by using an extra-high pressure mercury lamp of 500 W from the vertical direction for 45 seconds. Thus, the liquid crystal alignment film 18 was formed.

On the other hand, by the same method, a liquid crystal alignment film 181 in which the alignment was controlled so that the anti-parallel alignment was obtained was formed on the surface of a second substrate 17 provided with color filter group 15 (G, B, R denote color filters of green, blue, red, respectively) and second electrodes 16.

Next, the first substrate 14 and the second substrate 17 were positioned so that the electrode on each substrate were facing each other, and fixed with spacers 19 and an adhesive 20 with about a 5 μm gap. Thereafter, the nematic liquid crystal 21 was injected between the substrates 14 and 17, and polarizing plates 22 and 23 were provided. Thus, a liquid crystal display apparatus was produced. At this time, the pre-tilt angle of the injected liquid crystal was about 1°.

This liquid crystal display apparatus was able to display images in the direction shown by arrow A by being entirely irradiated with backlight 24 and by driving each transistor 25 with video signals.

In this embodiment, by irradiating the substrate with polarized light at the time of the light irradiation, the realignment (second alignment) of the molecules that constitute the monomolecular film and are fixed to the surface of the substrate and fixing of alignment direction were carried out. In the case where the irradiation was carried out without polarizing light from the extra-high pressure mercury lamp, the alignment direction remained in the direction opposite to the direction in which the substrate was hung at the time of vapor washing and the constituent molecules were polymerized and fixed by the photo reaction. As a result, the heat resistance of alignment property was improved, however, more mis-inclinations were observed as compared with the case of irradiation of polarized light.

In this Embodiment, as the light for exposure, light of 365 nm which is i rays from an extra-high pressure mercury lamp was used. However, light of 436 nm, 405 nm or 254 nm or light of 248 nm obtainable from a KrF excimer laser was also usable as light for exposure in accordance with the absorption degree of light. In particular, light of 248 nm or 254 nm provides high alignment efficiency because it is absorbed readily by most substances.

Furthermore, by using a silane-based surfactant including a nematic liquid crystal structure having a specific surface energy or a ferroelectric liquid crystal structure, the alignment regulation force of the obtained liquid crystal alignment film was able to be enhanced.

In this embodiment, by producing the liquid crystal alignment film so that liquid crystal is aligned while being twisted at 90°, a TN type liquid crystal liquid crystal display apparatus was able to be produced. Moreover, in the step of irradiation of polarized light, when the process of exposure was carried out by using a mask, dividing each pixel into a plurality of sections in a pattern, and by exposing while changing the alignment direction, a multi-domain liquid crystal display apparatus was able to be produced.

Furthermore, in this Embodiment, by using an IPS type TFT array substrate as a first substrate, IPS type liquid crystal display apparatus was able to be produced. Furthermore, in this embodiment, by using the IPS type TFT array substrate as the first substrate, and by forming the liquid crystal alignment film on the surface of the second substrate and liquid crystal alignment film on the surface of the IPS type TFT array substrate so that the alignment directions of the above-mentioned two films were anti-parallel to each other, an IPS type liquid crystal alignment film having a wide viewing angle was able to be produced.

Finally, it is understood that the invention may be embodied in other specific forms without departing from the spirit or essential characteristics thereof The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing an alignment chemisorption monomolecular film comprising a process (A) and a process (B), said process (A) comprising the step of forming a monomolecular film by chemisorption on a hydrophilic surface of a base material by bringing the hydrophilic surface into contact with a silane-based surfactant having a carbon chain or a siloxane bond chain so as to cause a chemical reaction between them, thereby bonding one end of the surfactant molecules to the hydrophilic surface, and said process (B) comprising the steps of orienting the base material with the monomolecular film in a predetermined orientation, vapor-washing said oriented base material with vapor of an organic solvent, and performing a first alignment of the surfactant molecules constituting the film by flow of condensation of the vapor on the film.

2. The method according to claim 1, wherein a process (C) is included in addition to said processes (A) and (B), said process (C) comprises the steps of irradiating said chemisorption monomolecular film with polarized light, thereby performing a second alignment of the first aligned surfactant molecules in the direction of said polarized light.

3. The method according to claim 2, wherein said silane-based surfactant comprises a photosensitive group, at least one molecular chain selected from the group consisting of a linear carbon chain and a siloxane bond chain, and at least one functional group selected from the group consisting of a chlorosilyl group, an alkoxysilyl group and an isocyanate silyl group.

4. The method according to claim 3, wherein said photosensitive group is at least one functional group selected from the group consisting of a cinnamoyl group, a chalcone group, a methacryloyl group and a diacetylene group.

5. The method according to claim 1, wherein said silane-based surfactant comprises at least one functional group selected from the group consisting of a trifluoromethyl group, a methyl group, a vinyl group, an allyl group, an ethynyl group, a phenyl group, an aryl group, a halogen group, an alkoxy group, a cyano group, an amino group, a hydroxyl group, a carbonyl group, an ester group and a carboxyl group.

6. The method according to claim 1, wherein said silane-based surfactant comprises at least one molecular chain of a linear carbon chain and a siloxane bond chain, and at least one functional group selected from the group consisting of a chlorosilyl group, an alkoxysilyl group and an isocyanate silyl group, and said organic solvent for the vapor-washing comprises a nonaqueous organic solvent containing no water.

7. The method according to claim 6, wherein said nonaqueous organic solvent comprises at least one functional group selected from the group consisting of an alkyl group, a carbon fluoride group, a carbon chloride group and a siloxane group.

8. The method according to claim 1, wherein, in said process (A), a film comprising a large number of SiO groups is formed on the surface of the base material, and a monomolecular film is formed on this film.

9. A method for producing a liquid crystal alignment film comprising the method according to claim 1, wherein, in said process (A), said base material is a substrate provided with electrodes, and at least the surface provided with electrodes of said substrate is brought into contact with said silane-based surfactant.

10. The method according to claim 9, wherein said silane-based surfactant comprises a photosensitive group, and a process (D) is included in addition to the processes (A) and (B), said process (D) comprises the step of irradiating the first alignment surfactant molecules of the monomolecular film with light so as to fix a state of the first alignment by polymerizing or crosslinking the photosensitive groups with each other.

11. The method according to claim 10, wherein said process (D) comprises the step of irradiating said monomolecular film, in which the state of first alignment is fixed, with polarized light, thereby performing a second alignment of the first alignment surfactant monomolecules, and fixing a state of the second alignment by polymerizing or crosslinking the photosensitive groups with each other at the same time.

12. The method according to claim 11, wherein the liquid crystal alignment film is a multi-domain type liquid crystal alignment film, in which patterned irradiation of polarized light is carried out twice or more.

13. The method according to claim 9, wherein said silane-based surfactant comprises at least one functional group selected from the group consisting of a chlorosilyl group, an alkoxysilyl group and an isocyanate silyl group.

14. The method according to claim 10, wherein said photosensitive group is at least one photosensitive group selected from the group consisting of a cinnamoyl group, a chalcone group, a methacryloyl group and a diacetylene group.

15. The method according to claim 9, wherein plural kinds of silane-based surfactants are mixed and used as said silane-based surfactant.

16. The method according to claim 15, wherein a plural kinds of silane-based surfactants having different molecular lengths are mixed and used as said silane-based surfactant, and the tilt of the silane-based surfactant molecules having the longest molecular length in the mixture with respect to the substrate is controlled to a predetermined angle by changing the molecular length of the silane-based surfactant molecules having a relatively shorter molecular length in the mixture.

17. The method according to claim 15, wherein plural kinds of silane-based surfactants having different molecular lengths are mixed and used as said silane-based surfactant, and the tilt of the silane-based surfactant molecules having the longest molecular length in the mixture with respect to the substrate is controlled to a predetermined angle by changing the mixing ratio of said plural kinds of silane-based surfactants.

18. The method according to claim 9, wherein said silane-based surfactant comprises at least one molecular chain of a linear carbon chain and a siloxane bond chain, and at least one functional group selected from the group consisting of a chlorosilyl group, an alkoxysilyl group and an isocyanate silyl group, and said organic solvent for the vapor washing comprises a nonaqueous organic solvent containing no water.

19. The method according to claim 9, wherein said silane-based surfactant comprises at least one functional group selected from the group consisting of a trifluoromethyl group, a methyl group, a vinyl group, an allyl group, an ethynyl group, a phenyl group, an aryl group, a halogen group, an alkoxy group, a cyano group, an amino group, a hydroxyl group, a carbonyl group, an ester group and an carboxyl group at the terminal or part of the carbon chain or siloxane bond chain.

20. The method according to claim 18, wherein the nonaqueous organic solvent comprises at least one functional group selected from the group consisting of an alkyl group, a carbon fluoride group, a carbon chloride group and a siloxane group.

21. The method according to claim 9, wherein a substrate on which a film having SiO groups at least on the surface provided with electrode is used as said substrate, and a monomolecular film is formed on this film.

22. A method for producing a liquid crystal display apparatus comprising the method according to claim 1, wherein, in said process (A), said base material is one substrate provided with one electrode group in which electrodes are arranged in a matrix array, and the surface provided with the electrode group is brought into contact with said silane-based surfactant, and a process (E) is included in addition to the processes (A) and (B), said process (E) comprising the steps of facing the surface having the electrode group of said one substrate and another substrate at a predetermined interval, positioning the both substrates and injecting a liquid crystal composition between the substrates.

23. The method according to claim 22, wherein, in said process (A), a film comprising SiO groups is formed on at least the surface provided with the electrode group of said one substrate, and a monomolecular film that is a liquid crystal alignment film is formed on this film.

24. The method according to claim 22, wherein, in said process (E), said another substrate has another electrode or electrode group, and said process (E) comprises the step of facing the surfaces having electrode or electrode group of said one and said another substrates.

25. The method according to claim 22, wherein, in said process (A), said silane-based surfactant comprises photosensitive groups, and said process (B) comprises the steps of performing a first alignment of the fixed molecules constituting the monomolecular film, and then irradiating said monomolecular film with light so as to fix the first alignment state by polymerizing or crosslinking the photosensitive groups each other.

26. The method according to claim 25, wherein said process (B) comprises the step of irradiating said monomolecular film, in which the state of a first alignment is fixed, with polarized light, thereby performing a second alignment of the first alignment silane-based surfactant molecules, and fixing the second alignment state by polymerizing or crosslinking said photosensitive groups at the same time.

27. The method according to claim 26, wherein said liquid crystal display apparatus is a multi-domain type liquid crystal display apparatus, and the method comprises the step of irradiating the patterned polarization with light twice or more so as to polymerize the molecules constituting the monomolecular film so that a plurality of patterned sections have different alignment directions in the respective pixels.

28. The method according to claim 22, wherein said liquid crystal display apparatus is a twist nematic (TN) type liquid crystal display apparatus, said method comprises the step of forming a monomolecular film by chemical adsorption so that liquid crystal is aligned while being twisted at 90°.

29. The method according to claim 22, wherein said liquid crystal display apparatus is an inplane switching system (IPS) liquid crystal display apparatus, said method comprises the step of producing an IPS type thin film transistor (TFT) array substrate provided with a set of electrodes on one side of its surface as said one substrate.

* * * * *